(12) United States Patent
Gardiner et al.

(10) Patent No.: US 7,328,638 B2
(45) Date of Patent: Feb. 12, 2008

(54) CUTTING TOOL USING INTERRUPTED CUT FAST TOOL SERVO

(75) Inventors: Mark E. Gardiner, Santa Rosa, CA (US); Alan B. Campbell, Santa Rosa, CA (US); Dale L. Ehnes, Cotati, CA (US); Daniel S. Wertz, Sebastopol, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 11/318,707

(22) Filed: Dec. 27, 2005

(65) Prior Publication Data

US 2007/0144315 A1 Jun. 28, 2007

(51) Int. Cl.
*B23B 3/00* (2006.01)
(52) U.S. Cl. .................... 82/123; 82/70.1; 82/157
(58) Field of Classification Search ............ 82/1.11, 82/70.1, 123, 157, 117, 158
See application file for complete search history.

(56) References Cited

U.S. PATENT DOCUMENTS

| | | | |
|---|---|---|---|
| 5,063,322 A * | 11/1991 | Sugita et al. ............... 310/341 |
| 5,291,812 A | 3/1994 | Yen et al. |
| 5,467,675 A | 11/1995 | Dow et al. |
| 6,040,653 A | 3/2000 | O'Neill |
| 6,170,367 B1 * | 1/2001 | Keller et al. ................ 82/1.11 |
| 6,237,452 B1 | 5/2001 | Ludwick et al. |
| 6,322,236 B1 | 11/2001 | Campbell et al. |
| 6,354,709 B1 | 3/2002 | Campbell et al. |
| 6,356,391 B1 | 3/2002 | Gardiner et al. |
| 6,560,026 B2 | 5/2003 | Gardiner et al. |
| 6,581,286 B2 | 6/2003 | Campbell et al. |
| 6,597,968 B2 | 7/2003 | Matsumoto et al. |
| 6,707,611 B2 | 3/2004 | Gardiner et al. |
| 6,811,274 B2 | 11/2004 | Olczak |
| 6,814,113 B1 * | 11/2004 | Daniels ...................... 144/351 |
| 6,844,950 B2 | 1/2005 | Ja Chisholm et al. |
| 6,845,212 B2 | 1/2005 | Gardiner et al. |
| 6,862,141 B2 | 3/2005 | Olczak |

(Continued)

FOREIGN PATENT DOCUMENTS

JP 63-077643 4/1988

(Continued)

OTHER PUBLICATIONS

UltraMill *Research@PEC,NCSU*, "Vibration Assisted Machining: Ultramill," North Carolina State University Precision Engineering Center, Raleigh, NC 27695, [http://airy.pec.ncsu.edu/PEC/research/projects/ultramill/index.html], Spring 2000, pp. 2.

(Continued)

*Primary Examiner*—Willmon Fridie, Jr.
(74) *Attorney, Agent, or Firm*—Lance L. Vietzke

(57) ABSTRACT

A cutting tool assembly having a tool post capable of lateral movement along a work piece to be cut and an actuator with a tool tip. The actuator provides for control of the movement of the tool tip in an x-direction into and out of the work piece in order to make discontinuous microstructures in it. The machined work piece can be used to make microstructured articles such as films having non-adjacent lenslets.

16 Claims, 7 Drawing Sheets

U.S. PATENT DOCUMENTS

| | | |
|---|---|---|
| 6,909,482 B2 | 6/2005 | Olczak |
| 6,925,915 B1 | 8/2005 | Claesson et al. |
| 6,945,099 B1 * | 9/2005 | Su et al. .................... 73/105 |
| 6,951,400 B2 | 10/2005 | Chisholm et al. |
| 6,952,627 B2 | 10/2005 | Olczak et al. |
| 7,089,836 B2 * | 8/2006 | Kato et al. .................... 82/1.11 |
| 7,101,694 B2 * | 9/2006 | Hirokawa et al. .......... 435/189 |
| 2002/0035231 A1 | 3/2002 | Whitehouse et al. |
| 2003/0108710 A1 | 6/2003 | Coyle et al. |
| 2003/0112521 A1 | 6/2003 | Gardiner et al. |
| 2003/0183050 A1 | 10/2003 | Moncton |
| 2004/0035266 A1 | 2/2004 | Montesanti et al. |
| 2004/0045419 A1 | 3/2004 | Bryan et al. |
| 2004/0109663 A1 | 6/2004 | Olczak |
| 2005/0223858 A1 | 10/2005 | Lu et al. |

FOREIGN PATENT DOCUMENTS

| | | |
|---|---|---|
| JP | 9-275689 | 10/1997 |
| JP | 2002-301601 | 10/2002 |
| JP | 2004098230 A | 4/2004 |
| KR | 2004096676 A | 9/2005 |
| WO | WO 97/48521 | 12/1997 |
| WO | WO 00/25963 | 5/2000 |
| WO | WO 00/50201 | 8/2000 |
| WO | WO 02/06005 A1 | 1/2002 |
| WO | WO 02/37168 A2 | 5/2002 |
| WO | WO 02/37168 A3 | 5/2002 |
| WO | WO 03/086688 A1 | 10/2003 |
| WO | WO 2005/043266 A2 | 5/2005 |
| WO | WO 2005/043266 A3 | 5/2005 |

OTHER PUBLICATIONS

Edward M. Trent & Paul K. Wright, *Metal Cutting*, 4th ed., Butterworth, Heinemann, 2000, pp. 258-260.

Zhang Jin-Hua, *Theory and Technique of Precision Cutting*, Pergamon Press, 1991, Chap. 2, "Nature of Cutting Force Variation in Precision Cutting," pp. 18-31.

M. K. Krueger, S. C. Yoon, D. Gong, S. B. McSpadden Jr., L. J. O'Rourke, R. J. Parten, "New Technology in Metalworking Fluids and Grinding Wheels Achieves Tenfold Improvement in Grinding Performance," Coolants/Lubricants for Metal Cutting and Grinding Conference, Chicago, Illinois, Milacron, Inc. and Oak Ridge National Laboratory, Jun. 7, 2000, pp. 15.

* cited by examiner

CUTTING TOOL USING INTERRUPTED CUT FAST TOOL SERVO

BACKGROUND

Machining techniques can be used to create a wide variety of work pieces such as microreplication tools. Microreplication tools are commonly used for extrusion processes, injection molding processes, embossing processes, casting processes, or the like, to create microreplicated structures. The microreplicated structures may comprise optical films, abrasive films, adhesive films, mechanical fasteners having self-mating profiles, or any molded or extruded parts having microreplicated features of relatively small dimensions, such as dimensions less than approximately 1000 microns.

The microstructures can also be made by various other methods. For example, the structure of the master tool can be transferred on other media, such as to a belt or web of polymeric material, by a cast and cure process from the master tool to form a production tool; this production tool is then used to make the microreplicated structure. Other methods such as electroforming can be used to copy the master tool. Another alternate method to make a light directing film is to directly cut or machine a transparent material to form the appropriate structures. Other techniques include chemical etching, bead blasting, or other stochastic surface modification techniques.

SUMMARY

A first cutting tool assembly includes a tool post and an actuator configured for attachment to the tool post and for electrical communication with a controller. A tool tip attached to the actuator is mounted for movement with respect to a work piece to be cut. The actuator provides for movement of the tool tip in an x-direction into and out of the work piece, and the tool tip is in discontinuous contact with the work piece during cutting of it.

A second cutting tool assembly includes a tool post and an actuator configured for attachment to the tool post and for electrical communication with a controller. A tool tip attached to the actuator is mounted for movement with respect to a work piece to be cut. The actuator provides for movement of the tool tip in an x-direction into and out of the work piece. The tool tip is in discontinuous contact with the work piece during cutting, and the assembly can vary a taper-in angle of the tool tip into the work piece and a taper-out angle of the tool tip out of the work piece during the cutting.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Cutting Tool System

General diamond turning techniques are described in PCT Published Application WO 00/48037, incorporated herein by reference as if fully set forth. The apparatus used in methods and for making optical films or other films can include a fast servo tool. As disclosed in WO 00/48037, a fast tool servo (FTS) is a solid state piezoelectric (PZT) device, referred to as a PZT stack, which rapidly adjusts the position of a cutting tool attached to the PZT stack. The FTS allows for highly precise and high speed movement of the cutting tool in directions within a coordinate system as further described below.

Figure 1:
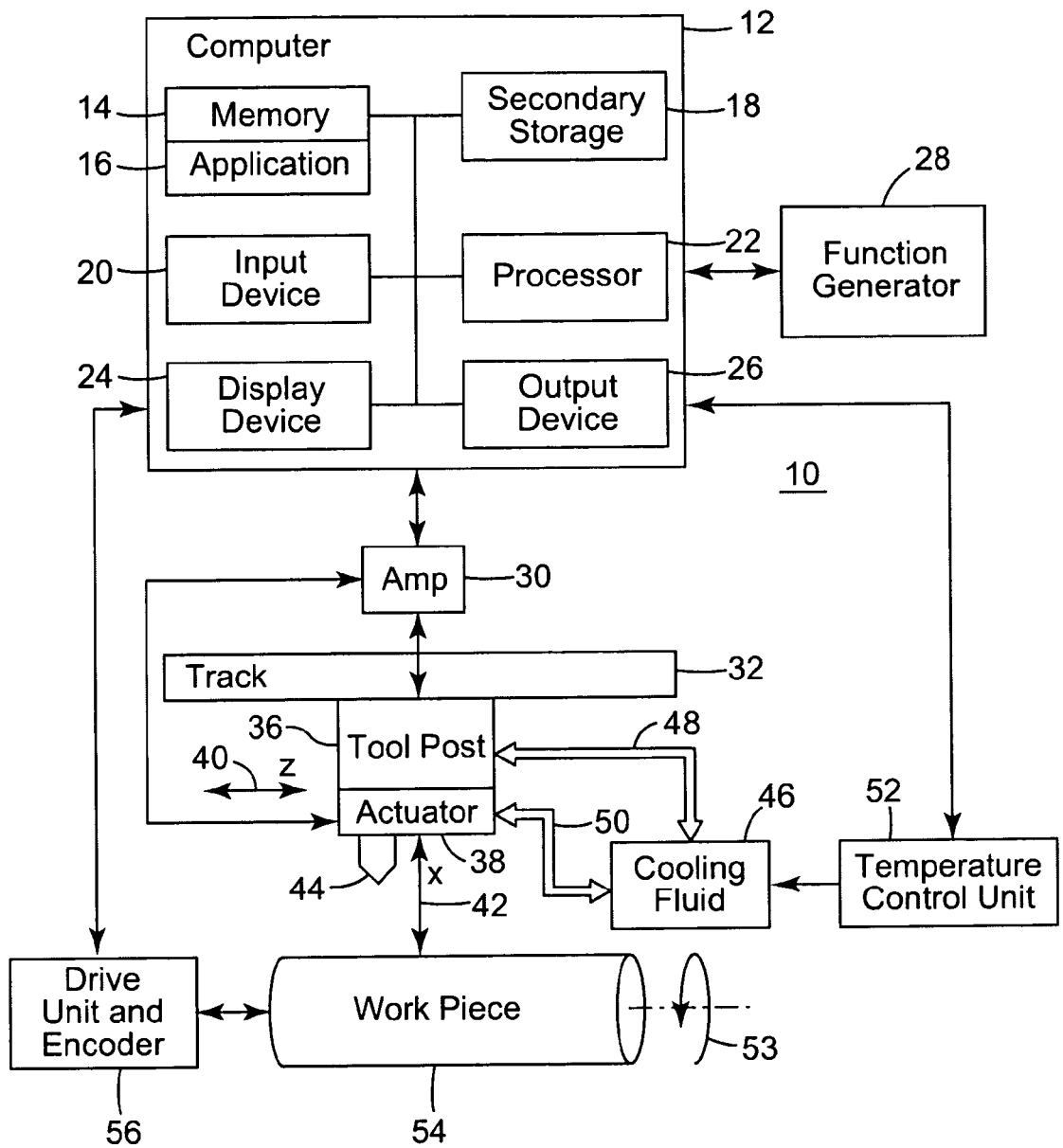
FIG. 1 is a diagram of a cutting tool system for making microstructures in a work piece.

FIG. 1 is a diagram of a cutting tool system 10 for making microstructures in a work piece. Microstructures can include any type, shape, and dimension of structures on, indenting into, or protruding from the surface of an article. For example, microstructures created using the actuators and system described in the present specification can have a 1000 micron pitch, 100 micron pitch, 1 micron pitch, or even a sub-optical wavelength pitch around 200 nanometers (nm). Alternatively, in other embodiments, the pitch for the microstructures can be greater than 1000 microns, regardless as to how they are cut. These dimensions are provided for illustrative purposes only, and microstructures made using the actuators and system described in the present specification can have any dimension within the range capable of being tooled using the system.

System 10 is controlled by a computer 12. Computer 12 has, for example, the following components: a memory 14 storing one or more applications 16; a secondary storage 18 providing for non-volatile storage of information; an input device 20 for receiving information or commands; a processor 22 for executing applications stored in memory 16 or secondary storage 18, or received from another source; a display device 24 for outputting a visual display of information; and an output device 26 for outputting information in other forms such as speakers for audio information or a printer for a hardcopy of information.

The cutting of a work piece 54 is performed by a tool tip 44. An actuator 38 controls movement of tool tip 44 as work piece 54 is rotated by a drive unit and encoder 56, such as an electric motor controlled by computer 12. In this example, work piece 54 is shown in roll form; however, it can be implemented in planar form. Any machineable materials could be used; for example, the work piece can be implemented with aluminum, nickel, copper, brass, steel, or plastics (e.g., acrylics). The particular material to be used may depend, for example, upon a particular desired application such as various films made using the machined work piece. Actuator 38, and the actuators described below, can be implemented with stainless steel, for example, or other materials.

Actuator 38 is removably connected to a tool post 36, which is in turn located on a track 32. The tool post 36 and actuator 38 are configured on track 32 to move in both an x-direction and a z-direction as shown by arrows 40 and 42. Computer 12 is in electrical connection with tool post 36 and actuator 38 via one or more amplifiers 30. When functioning as a controller, computer 12 controls movement of tool post 36 along track 32 and movement of tool tip 44 via actuator 38 for machining work piece 54. If an actuator has multiple PZT stacks, it can use separate amplifiers to independently control each PZT stack for use in independently controlling movement of a tool tip attached to the stacks. Computer 12 can make use of a function generator 28 in order to provide waveforms to actuator 38 in order to machine various microstructures in work piece 54, as further explained below.

The machining of work piece 54 is accomplished by coordinated movements of various components. In particular, the system, under control of computer 12, can coordinate and control movement of actuator 38, via movement of tool post 36, along with movement of the work piece in the c-direction and movement of tool tip 44 in one or more of the x-direction, y-direction, and z-direction, those coordinates being explained below. The system typically moves tool post 36 at a constant speed in the z-direction, although a varying speed may be used. The movements of tool post 36 and tool tip 44 are typically synchronized with the movement of work piece 54 in the c-direction (rotational movement as represented by line 53). All of these movements can be controlled using, for example, numerical control techniques or a numerical controller (NC) implemented in software, firmware, or a combination in computer 12.

The cutting of the work piece can include continuous and discontinuous cutting motion. For a work piece in roll form, the cutting can include a helix-type cutting (sometimes referred to as thread cutting) or individual circles around or about the roll. For a work piece in planar form, the cutting can include a spiral-type cutting or individual circles on or about the work piece. An X-cut can also be used, which involves a nearly straight cutting format where the diamond tool tip can traverse in and out of the work piece but the overall motion of the tool post is rectilinear. The cutting can also include a combination of these types of motions.

Work piece 54, after having been machined, can be used to make films having the corresponding microstructures for use in a variety of applications. Examples of those films include optical films, friction control films, and microfasteners or other mechanical microstructured components. The films are typically made using a coating process in which a polymeric material in a viscous state is applied to the work piece, allowed to at least partially cure, and then removed. The film composed of the cured polymer material will have substantially the opposite structures than those in the work piece. For example, an indentation in the work piece results in a protrusion in the resulting film. Work piece 54, after having been machined, can also be used to make other articles having discrete elements or microstructures corresponding with those in the tool.

Cooling fluid 46 is used to control the temperature of tool post 36 and actuator 38 via lines 48 and 50. A temperature control unit 52 can maintain a substantially constant temperature of the cooling fluid as it is circulated through tool post 36 and actuator 38. Temperature control unit 52 can be implemented with any device for providing temperature control of a fluid. The cooling fluid can be implemented with an oil product, for example a low viscosity oil. The temperature control unit 52 and reservoir for cooling fluid 46 can include pumps to circulate the fluid through tool post 36 and actuator 38, and they also typically include a refrigeration system to remove heat from the fluid in order to maintain it at a substantially constant temperature. Refrigeration and pump systems to circulate and provide temperature control of a fluid are known in the art. In certain embodiments, the cooling fluid can also be applied to work piece 54 in order to maintain a substantially constant surface temperature of the material to be machined in the work piece.

Figure 2:
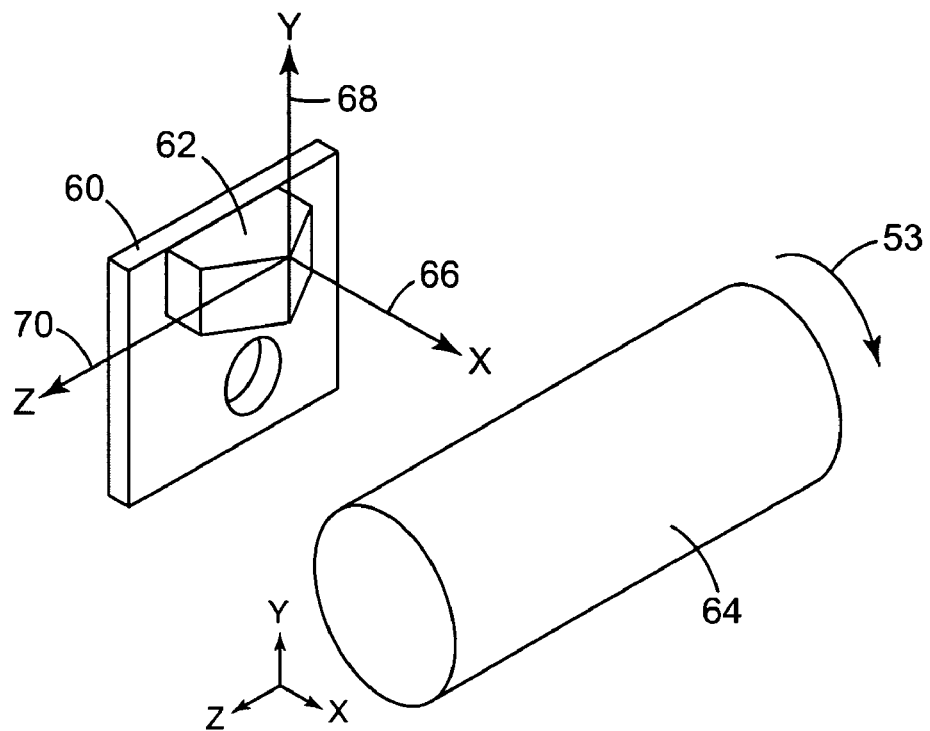
FIG. 2 is a diagram illustrating a coordinate system for a cutting tool.

FIG. 2 is a diagram illustrating a coordinate system for a cutting tool such as system 10. The coordinate system is shown as movement of a tool tip 62 with respect to a work piece 64. Tool tip 62 may correspond with tool tip 44 and is typically attached to a carrier 60, which is attached to an actuator. The coordinate system, in this exemplary embodiment, includes an x-direction 66, a y-direction 68, and a z-direction 70. The x-direction 66 refers to movement in a direction substantially perpendicular to work piece 64. The y-direction 68 refers to movement in a direction transversely across work piece 64 such as in a direction substantially parallel to a plane of rotation of work piece 64. The z-direction 70 refers to movement in a direction laterally along work piece 64 such as in a direction substantially parallel to the axis of rotation of work piece 64. The rotation of the work piece is referred to as the c-direction, as also shown in FIG. 1. If the work piece is implemented in planar form, as opposed to roll form, then the y-direction and z-direction refer to movement in mutually orthogonal directions across the work piece in directions substantially perpendicular to the x-direction. A planar form work piece can include, for example, a rotating disk or any other configuration of a planar material.

The system 10 can be used for, high precision, high speed machining. This type of machining must account for a variety of parameters, such as the coordinated speeds of the components and the work piece material. It typically must take into consideration the specific energy for a given volume of metal to be machined, for example, along with the thermal stability and properties of the work piece material. Cutting parameters relating to machining are described in the following references, all of which are incorporated herein by reference as if fully set forth: Machining Data Handbook, Library of Congress Catalog Card No. 66-60051, Second Edition (1972); Edward Trent and Paul Wright, Metal Cutting, Fourth Edition, Butterworth-Heinemann, ISBN 0-7506-7069-X (2000); Zhang Jin-Hua, Theory and Technique of Precision Cutting, Pergamon Press, ISBN 0-08-035891-8(1991); and M. K. Krueger et al., New Technology in Metalworking Fluids and Grinding Wheels Achieves Tenfold Improvement in Grinding Performance, Coolant/Lubricants for Metal Cutting and Grinding Conference, Chicago, Ill., U.S.A., Jun. 7, 2000.

PZT Stack, Tool Tip Carrier, and Tool Tip

Figure 3:
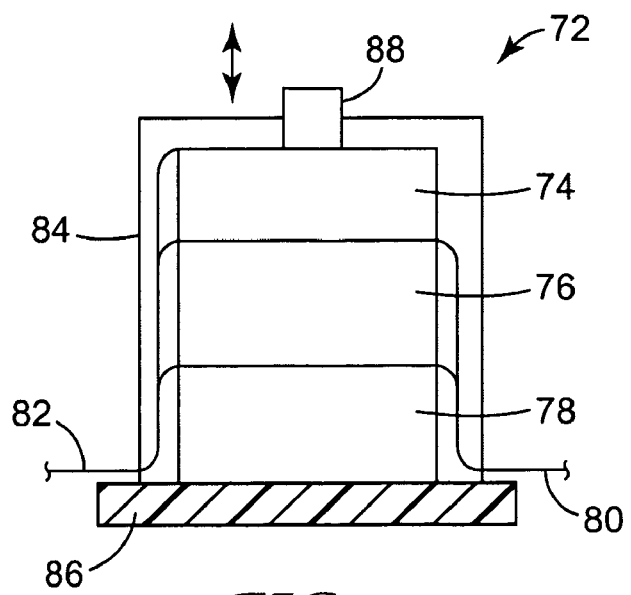
FIG. 3 is a diagram of an exemplary PZT stack for use in a cutting tool.

FIG. 3 is a diagram of an exemplary PZT stack 72 for use in a cutting tool. A PZT stack is used to provide movement of a tool tip connected to it and operates according to the PZT effect, which is known in the art. According to the PZT effect, an electric field applied to certain types of materials causes expansion of them along one axis and contraction along another axis. A PZT stack typically includes a plurality of materials 74, 76, and 78 enclosed within a casing 84 and mounted on a base plate 86. The materials in this exemplary embodiment are implemented with a ceramic material subject to the PZT effect. Three disks 74, 76, and 78 are shown for exemplary purposes only and any number of disks or other materials, and any type of shapes of them, can be used based upon, for example, requirements of particular embodiments. A post 88 is adhered to the disks and protrudes from casing 84. The disks can be implemented with any PZT material such as for example, a barium titanate, lead zirconate, or lead titanate material mixed, pressed, based, and sintered. One such PZT material is available from Kinetic Ceramics, Inc., 26240 Industrial Blvd., Hayward, Calif. 94545, U.S.A. The disks can also be implemented with a magnetostrictive material, for example.

Electrical connections to the disks 74, 76, and 78, as represented by lines 80 and 82, provide electrical fields to them in order to provide for movement of post 88. Due to the PZT effect and based upon the type of electric field applied, precise and small movement of post 88, such as movement within several microns, can be accomplished. Also, the end of PZT stack 72 having post 88 can be mounted against one or more Belleville washers, which provides for preloading of the PZT stack. The Belleville washers have some flexibility to permit movement of post 88 and a tool tip attached to it.

Figure 4A:
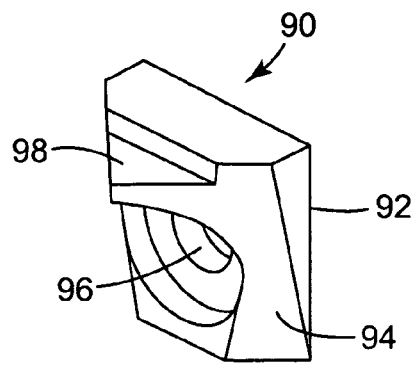
FIG. 4A is a perspective view of a tool tip carrier.
Figure 4B:
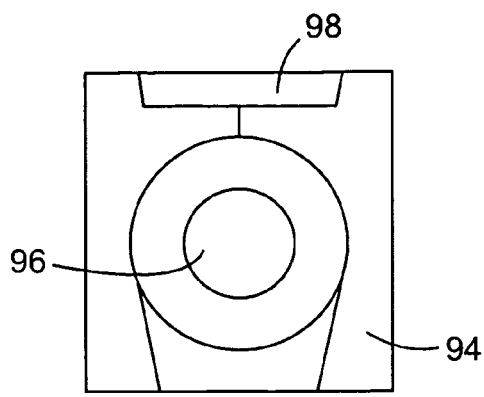
FIG. 4B is a front view of a tool tip carrier for holding a tool tip.
Figure 4C:
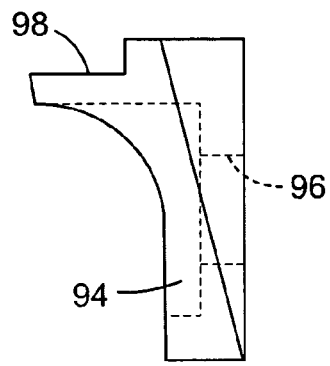
FIG. 4C is a side view of a tool tip carrier.
Figure 4D:
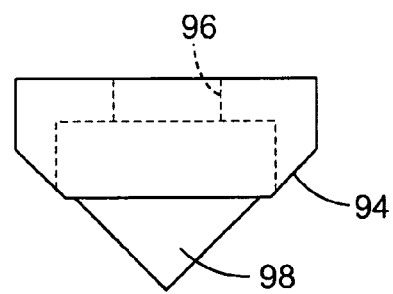
FIG. 4D is a top view of a tool tip carrier.

FIGS. 4A-4D are views of an exemplary tool tip carrier 90, which would be mounted to post 88 of the PZT stack for control by an actuator, as explained below. FIG. 4A is a perspective view of tool tip carrier 90. FIG. 4B is a front view of tool tip carrier 90. FIG. 4C is a side view of tool tip carrier 90. FIG. 4D is a top view of tool tip carrier 90.

As shown in FIGS. 4A-4D, tool tip carrier 90 includes a planar back surface 92, a tapered front surface 94, and a protruding surface 98 with angled or tapered sides. An aperture 96 provides for mounting of tool tip carrier 90 onto a post of a PZT stack. Tapered surface 98 would be used for mounting of a tool tip for machining of a work piece. In this exemplary embodiment, tool tip carrier 90 includes a planar surface to enhance stability of mounting it by providing for more surface area contact when mounted to a PZT stack, and it includes the tapered front surfaces to reduce the mass of it. Tool tip carrier 90 would be mounted to post 88 of the PZT stack by use of an adhesive, brazing, soldering, a fastener such as a bolt, or in other ways.

Other configurations of tool tip carriers are possible based, for example, upon requirements of particular embodiment. The term "tool tip carrier" is intended to include any type of structure for use in holding a tool tip for machining a work piece. Tool tip carrier 90 can be implemented with, for example, one or more of the following materials: sintered carbide, silicon nitride, silicon carbide, steel, titanium, diamond, or synthetic diamond material. The material for tool tip carrier 90 preferably is stiff and has a low mass.

Figure 5A:
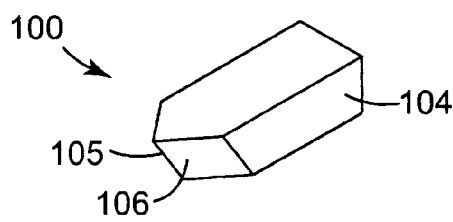
FIG. 5A is a perspective view of a tool tip.
Figure 5B:
FIG. 5B is a front view of a tool tip.
Figure 5C:
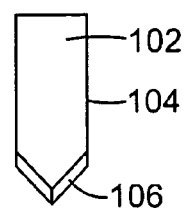
FIG. 5C is a bottom view of a tool tip.
Figure 5D:
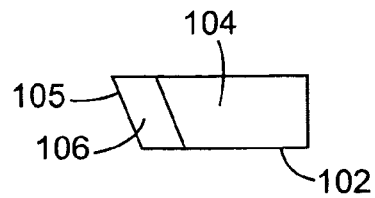
FIG. 5D is a side view of a tool tip.

FIGS. 5A-5D are views of an exemplary tool tip 100, which would be secured to surface 98 of tool tip carrier 90 such as by use of an adhesive, brazing, soldering, or in other ways. FIG. 5A is a perspective view of tool tip 100. FIG. 5B is a front view of tool tip 100. FIG. 5C is a bottom view of tool tip 100. FIG. 5D is a side view of tool tip 100. As shown in FIGS. 5A-5D, tool tip 100 includes sides 104, tapered and angled front surfaces 106, and a bottom surface 102 for securing it to surface 98 of tool tip carrier 90. The front portion 105 of tool tip 100 is used for machining of a work piece under control of an actuator. Tool tip 90 can be implemented with, for example, a diamond slab.

Interrupted Cut FTS Actuator

An interrupted cut FTS actuator can be used to make small microstructures as the tool tip is in discontinuous contact with work piece during cutting, creating non-adjacent microstructures. These features can be used to make film light guides, micro-fluidic structures, segmented adhesives, abrasive articles, optical diffusers, high contrast optical screens, light redirecting films, anti-reflection structures, light mixing, and decorative films.

The actuator can provide for other advantages. For example, the features can be made so small as to be invisible to the naked eye. This type of feature reduces the need for a diffuser sheet to hide the light extraction features in a liquid crystal display, for example. Use of crossed BEF films above the light guide also causes mixing that would in combination with these small features eliminate the need for the diffuser layer. Another advantage is that the extraction features can be made linear or circular. In the linear case, they can be used with conventional cold cathode fluorescent lamp (CCFL) light sources, for example. In the circular case, the features can be made on circular arcs with a center point located where an LED would normally be positioned. Yet another advantage relates to programming and structure layout where all features need not lay along a single line as with a continuous groove. The area density of the light extraction features can be adjusted deterministically by arranging spacing along the features, spacing orthogonal to the features, and depth. Furthermore, the light extraction angle can be made preferential by selecting the angle and half angles of the cut facets.

The depth of the features may be in the region of 0 to 35 microns, for example, and more typically 0 to 15 microns. For a roll work piece, the length of any individual feature is controlled by the revolutions per minute (RPM) of the rotating work piece along the c-axis, and the response time of the FTS. The feature length can be controlled from 1 to 200 microns, for example. For a helix type cutting, the spacing orthogonal to the grooves (pitch) can also be programmed from 1 to 1000 microns. As illustrated below, the tool tip to make the features will taper-in and taper-out of the material, thereby creating structures, the shape of which are controlled by the RPM, the response time of the FTS, the resolution of the spindle encoder, and the clearance angle of the diamond tool tip (for example, a maximum of 45 degrees). The clearance angle can include a rake angle of the tool tip. The features can have any type of three-dimensional shape such as, for example, symmetrical, asymmetrical, semi-hemispherical, prismatic, and semi-ellipsoidal.

Figure 6A:
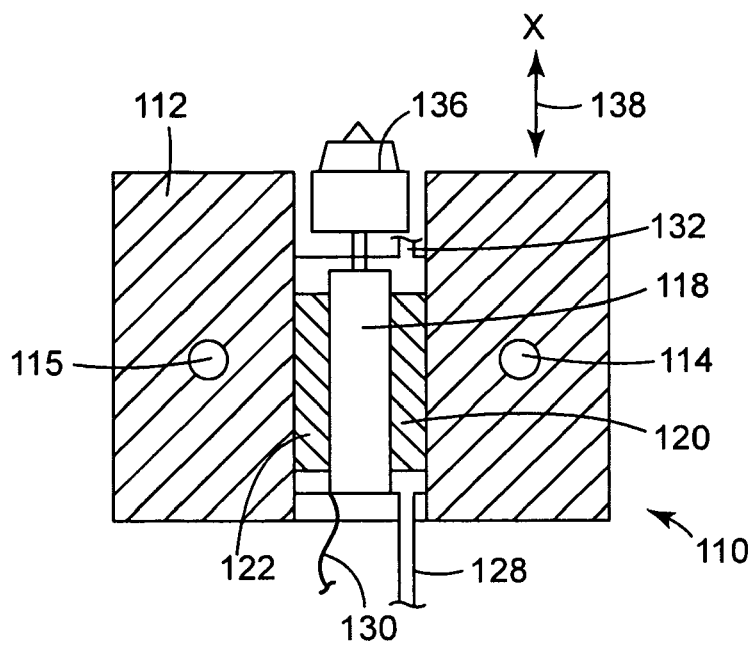
FIG. 6A is a top sectional view of an interrupted cut FTS actuator.
Figure 6B:
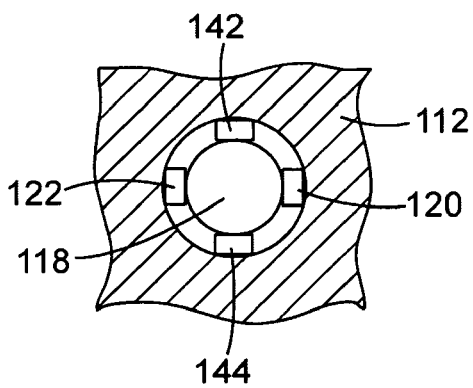
FIG. 6B is a front sectional view illustrating placement of a PZT stack in an actuator.
Figure 6C:
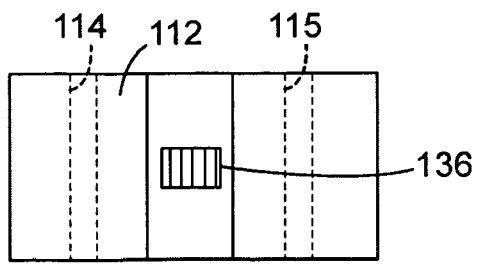
FIG. 6C is a front view of an actuator.
Figure 6D:
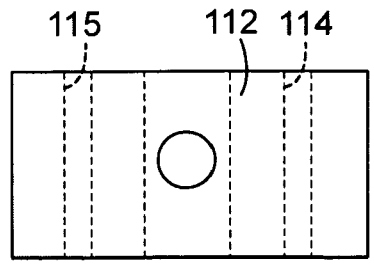
FIG. 6D is a back view of an actuator.
Figure 6E:
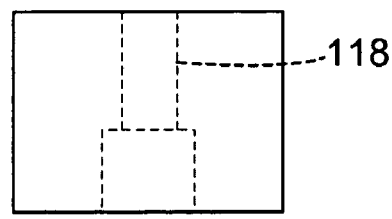
FIG. 6E is a top view of an actuator.
Figure 6F:
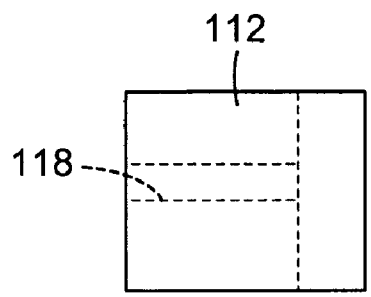
FIGS. 6F and 6G are side views of an actuator.
Figure 6G:
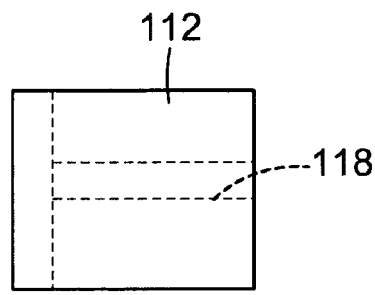
Figure 6H:
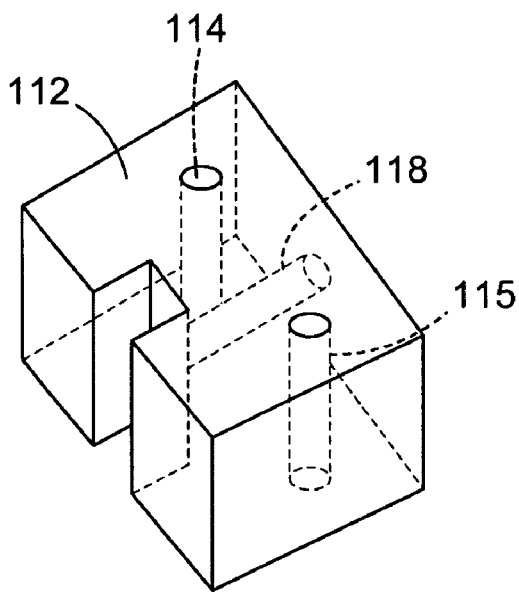
FIG. 6H is a perspective view of an actuator.

FIGS. 6A-6H are views of an exemplary actuator 110 for use in implementing an interrupted cut microreplication system and process. The term "actuator" refers to any type of actuator or other device that provides for movement of a tool tip in substantially an x-direction for use in machining a work piece. FIG. 6A is a top sectional view of actuator 110. FIG. 6B is a front sectional view illustrating placement of a PZT stack in actuator 110. FIG. 6C is a front view of actuator 110. FIG. 6D is a back view of actuator 110. FIG. 6E is a top view of actuator 110. FIGS. 6F and 6G are side views of actuator 110. FIG. 6H is a perspective view of actuator 110. Some details of actuator 110 in FIGS. 6C-6H have been removed for clarity.

As shown in FIGS. 6A-6H, actuator 110 includes a main body 112 capable holding an x-direction PZT stack 118. PZT stack 118 is attached to a tool tip carrier having a tool tip 136 for using in moving the tool tip in an x-direction as shown by arrow 138. PZT stack 118 can be implemented with the exemplary PZT stack 72 shown in FIG. 3. The tool tip on a carrier 136 can be implemented with the tool tip carrier shown in FIGS. 4A-4D and the tool tip shown in FIGS. 5A-5D. Main body 112 also includes two apertures 114 and 115 for use in removably mounting it to tool post 36, such as via bolts, for machining work piece 54 under control of computer 12.

PZT stack 118 is securely mounted in main body 112 for the stability required for precise controlled movement of tool tip 136. The diamond on tool tip 136 in this example is an offset 45 degree diamond with a vertical facet, although other types of diamonds may be used. For example, the tool tip can be V-shaped (symmetric or asymmetric), round-nosed, flat, or a curved facet tool. Since the discontinuous (non-adjacent) features are cut on a diamond turning machine, they can be linear or circular. Furthermore, since the features are not continuous, it is not required that they even be located along a single line or circle. They can be interspersed with a pseudorandomness.

PZT stack 118 is secured in main body 112 by rails such as rails 120 and 122. The PZT stack 118 can preferably be removed from main body 112 by sliding is along the rails and can be secured in place in main body 112 by bolts or other fasteners. PZT stack 118 includes electrical connection 130 for receiving signals from computer 12. The end cap of PZT stacks 118 includes a port 128 for receiving cooling fluid such as oil from reservoir 46, circulating it around the PZT stack, and delivering the oil back to reservoir 46, via port 132, for maintaining temperature control of it. Main body 112 can include appropriate channels for directing the cooling fluid around PZT stack 118, and the cooling fluid can be circulated by a pump or other device in temperature control unit 52.

FIG. 6B is a front sectional view illustrating placement of PZT stack 118 in main body 112 with the end cap of PZT stack 118 not shown. Main body 112 can include a plurality of rails in each aperture for the PZT stacks to hold them securely in place. For example, PZT stack 118 is surrounded by rails 120, 122, 142, and 144 in order to hold it securely in place when mounted in main body 112. The end cap attached to PZT stack 118 can accommodate bolts or other fasteners to secure PZT stack to one or more of the rails 120, 122, 142, and 144, and the end cap can also provide for sealing PZT stack 118 in main body 112 for use in circulating the cooling fluid around it. PZT stack 118 can include one or more Belleville washers positioned between the stacks and the tool tip carrier 136 for preloading of them.

Figure 7A:
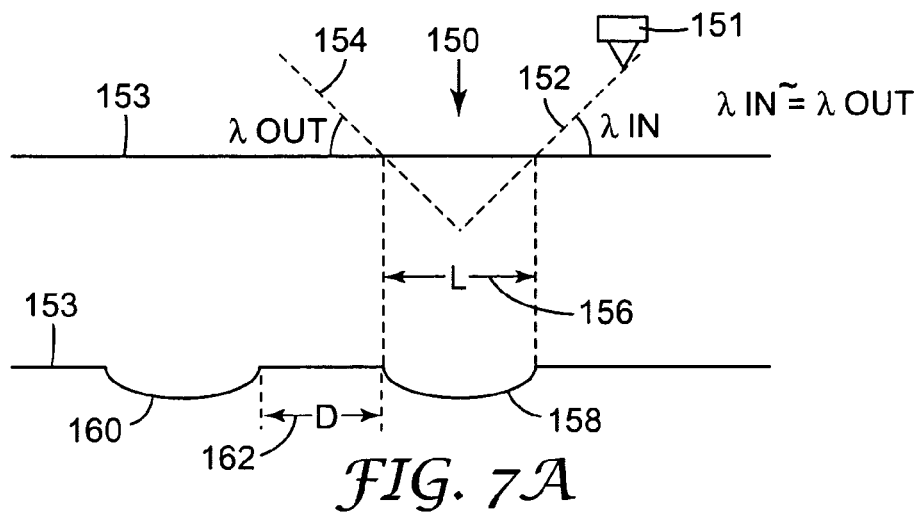
FIG. 7A is a diagram illustrating an interrupted cut with substantially equal taper-in and taper-out angles into and out of a work piece.
Figure 7B:
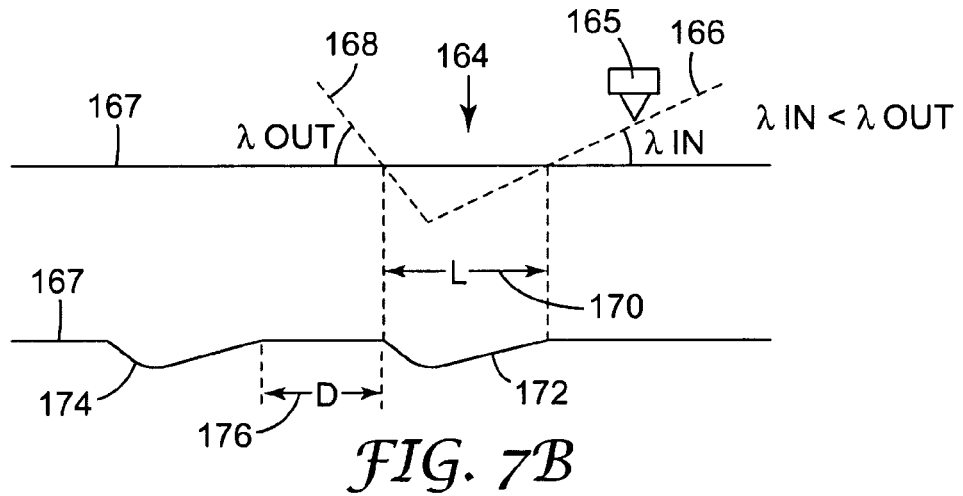
FIG. 7B is a diagram illustrating an interrupted cut with a taper-in angle less than a taper-out angle into and out of a work piece.
Figure 7C:
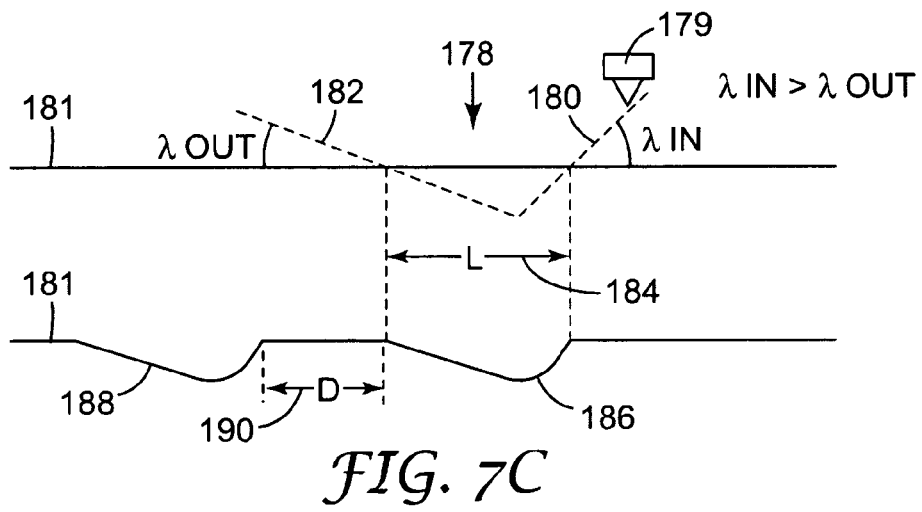
FIG. 7C is a diagram illustrating an interrupted cut with a taper-in angle greater than a taper-out angle into and out of a work piece.

FIGS. 7A-7C illustrate interrupted cut machining of a work piece using the exemplary actuator and system described above. In particular, FIGS. 7A-7C illustrate use of variable taper-in and taper-out angles of a tool tip, and those angles can be controlled using, for example, the parameters identified above. Each of FIGS. 7A-7C illustrate examples of the work piece before and after being cut with varying taper-in and taper-out angles. The taper-in angle is referred to as $\lambda_{IN}$ and the taper-out angle is referred to as $\lambda_{OUT}$. The terms taper-in angle and taper-out angle mean, respectively, an angle at which a tool tip enters a work piece and leaves a work piece during machining. The taper-in and taper-out angles do not necessarily correspond with angles of the tool tip as it moves through a work piece; rather, they refer to the angles at which the tool tip contacts and leaves the work piece. In FIGS. 7A-7C, the tool tips and work pieces can be implemented, for example, with the system and components described above.

FIG. 7A is a diagram illustrating an interrupted cut 150 with substantially equal taper-in and taper-out angles into and out of a work piece 153. As shown in FIG. 7A, a taper-in angle 152 of a tool tip 151 into a work piece 153 is substantially equal to a taper-out angle 154 ($\lambda_{IN} \approx \lambda_{OUT}$). The duration of the tool tip 151 into work piece 153 determines a length L (156) of the resulting microstructure. Using substantially equal taper-in and taper-out angles results in a substantially symmetrical microstructure 158 created by removal of material from the work piece by the tool tip. This process can be repeated to make additional microstructures, such as microstructure 160, separated by a distance D (162).

FIG. 7B is a diagram illustrating an interrupted cut with a taper-in angle less than a taper-out angle into and out of a work piece 167. As shown in FIG. 7B, a taper-in angle 166 of a tool tip 165 into a work piece 167 is less than a taper-out angle 168 ($\lambda_{IN} < \lambda_{OUT}$). The dwell time of the tool tip 165 in work piece 167 determines a length 170 of the resulting microstructure. Using a taper-in angle less than a taper-out angle results in an asymmetrical microstructure, for example microstructure 172, created by removal of material from the work piece by the tool tip. This process can be repeated to make additional microstructures, such as microstructure 174, separated by a distance 176.

FIG. 7C is a diagram illustrating an interrupted cut with a taper-in angle greater than a taper-out angle into and out of a work piece 181. As shown in FIG. 7C, a taper-in angle 180 of a tool tip 179 into a work piece 181 is greater than a taper-out angle 182 ($\lambda_{IN} > \lambda_{OUT}$). The dwell time of the tool tip 179 in work piece 181 determines a length 184 of the resulting microstructure. Using a taper-in angle greater than a taper-out angle results in an asymmetrical microstructure, for example microstructure 186, created by removal of material from the work piece by the tool tip. This process can be repeated to make additional microstructures, such as microstructure 188, separated by a distance 190.

In FIGS. 7A-7C, the dashed lines for the taper-in and taper-out angles (152, 154, 166, 168, 180, 182) are intended to conceptually illustrate examples of angles at which a tool tip enters and leaves a work piece. While cutting the work piece, the tool tip can move in any particular type of path, for example a linear path, a curved path, a path including a combination of linear and curved motions, or a path defined by a particular function.

Figure 8:
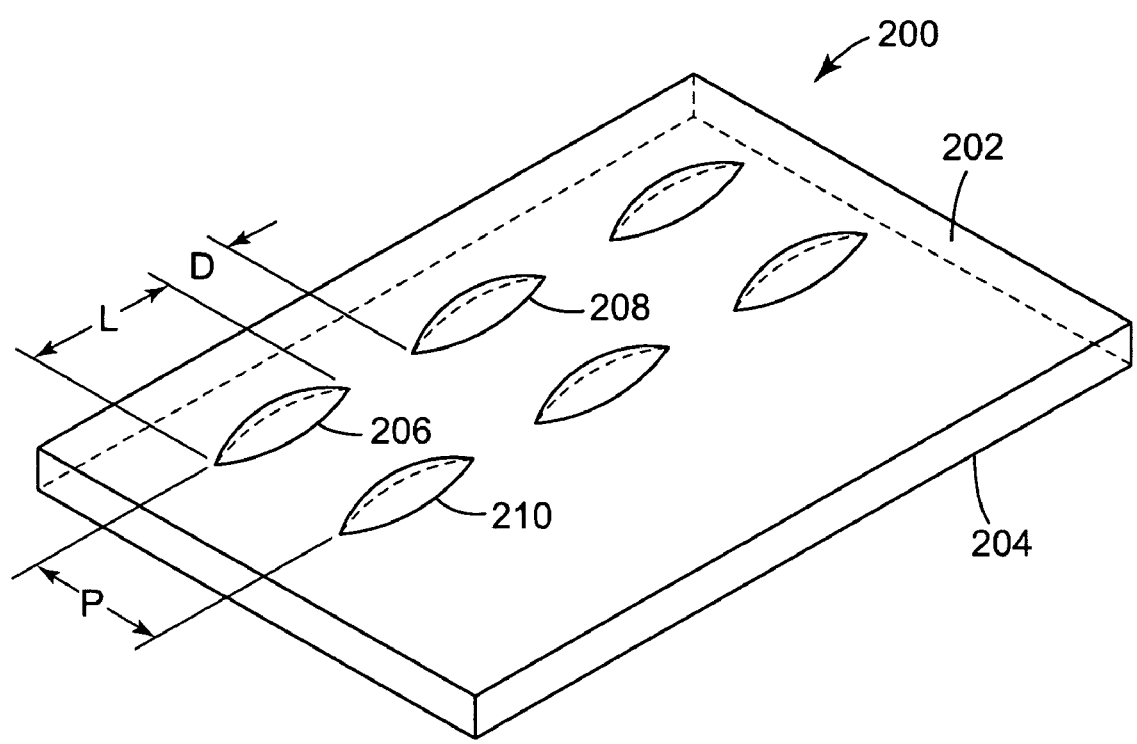
FIG. 8 is a diagram conceptually illustrating microstructures that can be made using the cutting tool system having an interrupted cut FTS actuator.

FIG. 8 is a diagram conceptually illustrating microstructures that can be made using the cutting tool system having an interrupted cut FTS actuator to make a machined work piece and using that work piece to make a structured film. As shown in FIG. 8, an article 200 includes a top surface 202 and a bottom surface 204. Top surface 202 includes interrupted cut protruding microstructures such as structures 206, 208, and 210, and those microstructures can be made using the actuators and system described above to machine a work piece and then using that work piece to make a film or article using a coating technique. In this example, each microstructure has a length L, the sequentially cut microstructures are separated by a distance D, and adjacent microstructures are separated by a pitch P. Examples of an implementation of those parameters are provided above.

While the present invention has been described in connection with an exemplary embodiment, it will be understood that many modifications will be readily apparent to those skilled in the art, and this application is intended to cover any adaptations or variations thereof. For example, various types of materials for the tool post, actuator, and tool tip, and configurations of those components, may be used without departing from the scope of the invention. This invention should be limited only by the claims and equivalents thereof.

What is claimed is:

1. An apparatus for machining a cylindrical work piece, comprising:
   a substantially cylindrical work piece mounted for rotational movement;
   a drive unit connected to the work piece for rotating the work piece;
   a tool post mounted on a track for movement substantially parallel to a surface of the work piece to be machined;
   an actuator mounted on the tool post, the actuator comprising:
      a main body having an aperture;
      a piezoelectric stack secured and preloaded in the main body aperture;
      a tool tip carrier connected to the piezoelectric stack; and
      a tool tip mounted on the tool tip carrier,
      wherein the piezoeloctric stack moves the tool tip in an x-direction substantially perpendicular to a surface of the work piece to be machined; and
   a controller, connected to the drive unit and the actuator, for controlling the movement of the work piece relative to the tool tip via the drive unit and for controlling the movement of the tool tip via the piezoelectric stack, wherein the controller via the piezoelectric stack moves the tool tip into and out of the surface of the work piece to be machined during cutting of the surface in order to make discontinuous features in the surface of the work piece.

2. The apparatus of claim 1, wherein the actuator is removably mounted to the tool post.

3. The apparatus of claim 1, further including a plate attached between the piezoelectric stack and the tool tip for the preloading of the piezoelectric stack.

4. The apparatus of claim 1, wherein the piezoelectric stack is comprised of one of the following materials: barium titanate; lead zirconate; lead titanate; or a magnetostrictive material.

5. The apparatus of claim 1, wherein the main body includes an aperture having a port for receiving a cooling fluid.

6. The apparatus of claim 4, wherein the plate comprises a Belleville washer.

7. The apparatus of claim 1, wherein the main body is comprised of stainless steel.

8. The apparatus of claim 5, further comprising a cooling fluid reservoir connected to the port for delivering the cooling fluid to the aperture.

9. The apparatus of claim 1, wherein the controller causes movement of the tool tip into and out of the surface of the work piece to be machined such that a taper-in angle of the tool tip into the surface of the work piece is substantially equal to a taper-out angle of the tool tip out of the surface of the work piece during the machining.

10. The apparatus of claim 1, wherein the controller causes movement of the tool tip into and out of the surface of the work piece to be machined such that a taper-in angle of the tool tip into the surface of the work piece is less than a taperout angle of the tool tip out of the surface of the work piece during the machining.

11. The apparatus of claim 1, wherein the controller causes movement of the tool tip into and out of the surface of the work piece to be machined such that a taper-in angle of the tool tip into the surface of the work piece is greater than a taper-out angle of the tool tip out of the surface of the work piece during the machining.

12. The apparatus of claim 1, wherein the features cut by the tool tip have one of the following shapes: symmetrical; asymmetrical; semi-bemispherical; prismatic; or semi-ellipsoidal.

13. The apparatus of claim 1, wherein the features cut by the tool tip have a pitch between 1 and 1000 microns.

14. The apparatus of claim 1, wherein the tool tip carrier is comprised of one of the following materials: sintered carbide; silicon nitride; silicon, carbide; steel; titanium; diamond; or synthetic diamond material.

15. The apparatus of claim 1, wherein the tool tip carrier has a planar back surface connected to the piezoelectric stack.

16. The apparatus of claim 15, wherein the tool tip carrier has a tapered front surface opposite the back surface.

* * * * *

UNITED STATES PATENT AND TRADEMARK OFFICE
CERTIFICATE OF CORRECTION

PATENT NO. : 7,328,638 B2 Page 1 of 1
APPLICATION NO. : 11/318707
DATED : February 12, 2008
INVENTOR(S) : Mark E. Gardiner It is certified that error appears in the above-identified patent and that said Letters Patent is hereby corrected as shown below:

Column 9,
Line 28, In Claim 1, delete "piezoeloctric" and insert -- piezoelectric --, therefor.

Column 10,
Line 23 (approx.), In Claim 10, delete "taperout" and insert -- taper-out --, therefor.
Line 33 (approx.), In Claim 12, delete "semi-bemispherical;" and insert
-- semi-hemispherical; --, therefor.
Line 39 (approx.), In claim 14, after "silicon" delete ",".

Signed and Sealed this

Tenth Day of June, 2008

JON W. DUDAS
*Director of the United States Patent and Trademark Office*